United States Patent Office 2,807,595
Patented Sept. 24, 1957

2,807,595
PROCESS FOR MODIFYING UREA-FORMALDE-HYDE SOLID FOAM

Northrop Brown, Wilmington, Del., assignor to E. I. du Pont de Nemours and Company, Wilmington, Del., a corporation of Delaware No Drawing. Application November 22, 1952, Serial No. 322,153

7 Claims. (Cl. 260—2.5)

This invention relates to novel urea-formaldehyde resin solid foams having a closed cell structure.

The manufacture of solid foams from thermosetting resins has become a rather well-developed art in recent years. These foams have been used as acoustic and insulating compositions and for a wide variety of miscellaneous applications. The urea-formaldehyde foams which have been produced commercially heretofore have been relatively fragile and have generally had an open cell structure with relatively few closed cells. Such a predominantly open cell structure is produced by dispersing gas throughout a mixture containing the uncured resin, followed by curing the resin. Numerous devices have been employed to achieve this result. For example, in one device the uncured resin is injected, with stirring, into a reaction vessel containing an acidic liquid foam, prepared by whipping air into water containing a surface active agent and an acid (cf. U. S. 2,076,295, 2,273,367, and 2,559,891); the resin is cured while distributed throughout the said liquid foams. Another procedure has been to dissolve gas under pressure in an uncured urea-formaldehyde containing liquid, and to cure the urea-formaldehyde resin while releasing the pressure abruptly, thus producing a foam. A common practice has been to include a blowing agent, such as an azide, in the resin mixture during molding, such blowing agents being capable of generating gas at the molding and curing temperature. Still another procedure has been to pump air through a suitable sparger into a liquid composed of water, surface-active agent, uncured resin, and curing catalyst. Recently a process for preparing urea-formaldehyde closed-cell foams has been proposed (Shackleton, Industrial Chemist, December 1949, p. 566–572). In that process the expansion of the resin is not brought about by gas bubbles, but mainly by emulsified globules of organic liquid, which can be removed after cell-formation by evaporation through porous cell walls.

The prior art solid urea-formaldehyde foams other than those described by Shackleton have been relatively impervious to moisture although on prolonged immersion they absorbed substantial quantities of water; for example, one such product had a density of 2 pounds per cubic foot, and absorbed three times its weight of water after 24 hours immersion in water under 4 pounds per square inch head (cf. U. S. 2,432,389).

In copending U. S. patent application of P. E. Lindvig, S. N. 322,051, filed November 22, 1952, (1834), a process is disclosed for preparing urea-formaldehyde foams having a predominantly closed cell structure which involves the following steps: (1) dispersing a low boiling water-insoluble liquid such as propane (under pressure), ethyl chloride, butenes, butane, pentane, dichlorotetrafluoroethane or trichloromonofluoromethane in an aqueous urea-formaldehyde resin solution in the presence of a surface-active agent to produce a stable emulsion; (2) mixing the said emulsion with an acidic or acid-yielding urea-formaldehyde-curing catalyst such as phosphoric acid, sulfur dioxide, formic acid; (3) causing the resin to expand by raising the temperature or reducing the pressure to effect vaporization of the liquid; (4) curing the urea-formaldehyde resin while the cells are expanded due to such vaporization, and (5) removing any remaining low boiling liquid and other ingredients of the liquid phase from the cured product by evaporation or by any other suitable process. This Lindvig process differed from the earlier emulsion process in that the globules of liquid in the Lindvig process were dispersed in a relatively viscous resin phase, and the cells formed by the globules expanded by gasification. The resulting bubble of vapor was surrounded by partially cured resin at such a stage of cure that it did not collapse, but ultimately hardened further to form a solid foam. In the Lindvig process, the liquid viscous urea-formaldehyde aqueous composition preferably had a urea-formaldehyde concentration of about 50% to 90%, by weight, excellent results being obtained at a resin solids content of about 75%. The viscosity of the urea-formaldehyde aqueous liquid was about 200 cps. to 10,000 cps. preferably about 1,000 cps. In general the mol ratio of formaldehyde to urea in the urea-formaldehyde composition was within the range of 1.4:1 to 2.5:1, excellent results being obtained when this formaldehyde-urea ratio was from 1.6:1 to 2.0:1. The blowing agent had to be a readily vaporizable water-insoluble inert liquid, best results being obtained with substances which were normally gaseous but which were liquid under the conditions of preparing the emulsion. The quantity of blowing agent could be varied rather widely and the density of the foam depended upon the quantity of blowing agent employed. A suitable quantity of blowing agent was about .02 to .30 parts by weight per unit weight of resin solids. Any suitable emulsifying agent was employed to disperse the gas in the viscous urea-formaldehyde aqueous liquid. Suitable emulsifying agents included dioctyl esters of sodium sulfo-succinic acids, sulfates of fatty acid monoglycerides, fatty alcohol sulfates, sodium alkyl aryl sulfonates, sorbitan monolaurates, polyoxyethylene ethers of palmitic acid, etc. The emulsion of the low-boiling liquid in the urea-formaldehyde liquid containing such an emulsifying agent could be prepared by simply mixing the low-boiling liquid with the aqueous liquid containing the urea-formaldehyde and emulsifying agent, and agitating the resulting mixture gently to produce the desired emulsifying action. During this mixing, the temperature had to be kept below the boiling point of the low-boiling liquid and, of course, above the freezing point of the liquid medium. (Note: Freezing point of the preferred urea-formaldehyde compositions, about −10° C.) The mixing could be done at a pressure greater than the vapor pressure of the blowing agent and this permitted gasification without changing the temperature of the mixture. The acidic catalyst was introduced into the mixture immediately before curing. During this stage of the process, the temperature was permitted to reach a curing temperature within the range of 20° to 115° C., preferably a temperature not exceeding 115° and preferably close to the boiling point of the blowing agent. The quantity of acid catalyst preferably was sufficient to produce a pH of about 2.5 to 4.5. In the case of phosphoric acid catalyst, this corresponds with about 0.5 to 4.0% of added catalyst, based on the total weight of the mixture. If desired the curing process could be carried out in a retaining vessel or mold but this was not absolutely essential since it was also possible to carry out the curing process after shaping the uncured foam on laths, frames, or other supporting means. When a receptacle was employed for the purpose of shaping the foam during curing the size of the receptacle was large enough to contain not only the liquid and solid ingredients, but also to hold at least about half of the quantity of blowing agent in the form as gas. In other words, the efficiency of the blowing agent was frequently of the order of magnitude of about 50%.

An object of the present invention is to provide further improvements in the process just described by adding a suitable plasticizer to the urea-formaldehyde mixture prior to hardening the same.

It has been disclosed in accordance with this invention that polyethylene glycols containing 3 to 50 oxyethylene units are excellent plasticizers or modifiers which can be used effectively to facilitate formation of urea-formaldehyde foam by a process otherwise the same as the process just described. This plasticizer is preferably added prior to introducing the blowing agent. The quantity added should be about 10% to 35% of the weight of resin solids. In many instances, it is apparent that one of the effects of this plasticizer is to slow up the rate of hardening of the urea-formaldehyde, and in certain instances this may be advantageous in that vaporization of the blowing agent and dilation of the resulting bubble can thus be made to occur satisfactorily, simultaneously with the curing reaction.

The invention is illustrated further by means of the following example.

EXAMPLE I

A mixture of 1000 grams of "Arboneeld" B liquid polymethylolurea (a commercial product manufactured by the process of the Kvalnes Reissue Patent 23,174 having a total formaldehyde:urea mol ratio of 5.0, and a solids content of 65% the remainder being water) and 162 grams of polyethylene glycol "400" was acidified to pH 2.2 with 2 N hydrochloric acid and allowed to stand overnight at room temperature. The solution was adjusted to pH 8.0 with 4 N sodium hydroxide, and 220 grams of urea, calculated to give a molar F/U (formaldehyde:urea ratio) of 2.3 was added. The mixture was heated to 50°, maintained at that temperature for 30 minutes, and cooled to room temperature. The pH was adjusted to 5.2 with 0.5 N hydrochloric acid, and the mixture heated to 85° and maintained at this temperature until the viscosity, as determined by Gardner bubble tubes, reached 880 centipoises. It was then cooled to room temperature and the pH was adjusted to 8.0 with 1 N sodium hydroxide. To this viscous liquid resin was added 112 grams of urea, calculated to give a final F/U of 1.8 and 15.2 grams of 75% "Aresklene" 375 (hereinabove defined) paste, calculated to give 1% of this surface active agent, based on solids content. This mixture was stored overnight at room temperature. Final viscosity of the finished resin (containing 14% polyethylene glycol, based on total solids) was 940 centipoises, as determined by a Brookfield viscometer.

One hundred fifty-three grams (calculated to give 100 grams of U/F solids) of the above liquid resin was chilled in a refrigerator to −5° C. Forty ml. of liquid butane was added and the mixture was stirred until a smooth emulsion was obtained. This was allowed to warm until expansion due to boiling of the butane commenced. An amount of 85% phosphoric acid equivalent to 2 grams of 100% acid was added with vigorous stirring. The mixture was then poured into a 6″ x 12″ stainless steel bread tray, and allowed to rise and set at room temperature.

The foam was allowed to dry for one month at room temperature. Properties of the foam were as follows compared to unplasticized foams of the same density made by a similar procedure:

Table 1
EFFECT OF POLYETHYLENE GLYCOL ON UF FOAM

| Direction of test compared to axis of foam growth | Test method A. S. T. M. | 14% polyethylene glycol plasticized foam | | Unmodified foam | |
|---|---|---|---|---|---|
| | | Parallel | Perpendicular | Parallel | Perpendicular |
| Density (lb./ft.³) | | 1.47 | | 1.47 | |
| Compressive modulus (p. s. i.): | | | | | |
| Initial | D–790 | 25.4 | 146 | 650 | 270 |
| Ultimate | | 3.9 | | | |
| Compressive strength (p.s.i.) | D–695 | No failure | ¹ 4.08 | 12.2 | 8.30 |
| Impact strength (ft./in.) | See below ² | 0.0144 | 0.0108 | 0.0043 | 0.0062 |
| Height from which ½″ diameter steel ball can be dropped without deforming sample. | | 6″ | | Less than 1″. | |
| Friability | | Not readily friable | | Readily friable. | |

¹ Slight fracture. With unmodified foams severe fracture occurs.
² Relative values estimated by same empirical test, not comparable with values reported for unfoamed resins, etc., however.

The molecular weight of the polyethylene glycol is critical, since the very high molecular weight polyethylene glycols actually have a weakening effect rather than a toughening action. Triethylene glycol has a slight toughening effect. The use of high molecular weight polypropylene glycols is limited since they are only partially compatible with the resin. Propylene glycol itself has a slight toughening effect, as does glycerine, ethyleneurea, diglycollic acid, and lactic acid. None of these has as high a toughening effect as propylene glycol.

Many other substances, e. g. sorbitol, dextrose, gelatine, starch, formamide, etc., have either no effect or a weakening effect. The outstanding tougheners and plasticizers in the process of the invention are the polyethylene glycols of intermediate molecular weight, e. g. ca. 5–25 oxyethylene groups per molecule.

It is to be understood that the present invention has a wide variety of applications especially in connection with the processes requiring a strong light-weight urea-formaldehyde foam. The fields of use of such foams include the manufacture of acoustic and insulating structures as well as in various display applications. The foams are of outstanding value in the chromatographic separation of mixtures; ordinary ink, when absorbed into these foams separates into strata of its variously colored ingredients.

It will be understood, of course, that there are numerous other applications for the urea-formaldehyde foams which are obtained in accordance with the process of this invention.

I claim:

1. A process for preparing a solid urea-formaldehyde foam which comprises emulsifying an inert organic water-insoluble liquid in an aqueous urea-formaldehyde resin solution having a viscosity within the range of 200 to 10,000 centipoises, the quantity of said liquid being from 0.02 to 0.30 parts by weight per unit weight of urea-formaldehyde, said emulsification being carried out in the presence of an emulsifying agent, introducing into the emulsion a curing agent capable of acid-curing said urea-formaldehyde, vaporizing the said liquid, and subjecting the resultant mixture, made up of cells containing the said vapors, to the hardening action of said acid-curing catalyst in the presence of 10% to 35%, based on the weight of the said resin, of polyethylene glycol, having 3 to 50 oxyethylene groups per molecule by maintaining the mixture at a curing temperature above the boiling point of the said inert organic liquid, said curing temperature being not in excess of 115° C. whereby a solid foam of substantially closed cell structure is obtained.

2. Process of claim 1 in which the said low boiling organic liquid is dichlorotetrafluoroethane.

3. Process of claim 1 in which the said low boiling organic liquid is butane.

4. Process of claim 1 in which the acid-curing catalyst is phosphoric acid.

5. Process of claim 1 in which the acid-curing catalyst is formic acid.

6. Process of claim 1 in which the mol ratio of formaldehyde:urea is within the range of 1.4:1 to 2.5:1.

7. Process of claim 1 in which the formaldehyde mol ratio is 1.8:1.

References Cited in the file of this patent

UNITED STATES PATENTS

| | | |
|---|---|---|
| 1,985,937 | Luther | Jan. 1, 1935 |
| 2,283,604 | Harrison | May 19, 1942 |
| 2,387,730 | Alderson | Oct. 30, 1945 |
| 2,582,228 | Brinkema | Jan. 15, 1952 |

FOREIGN PATENTS

| | | |
|---|---|---|
| 578,838 | Great Britain | July 15, 1946 |
| 586,199 | Great Britain | Mar. 11, 1947 |

OTHER REFERENCES

Shackleton: The Industrial Chemist (England), Dec. 1949, pages 566 to 572.

Pessel: Abstract of application 677,639 published April 3, 1951, Official Gazette, page 328.

UNITED STATES PATENT OFFICE

CERTIFICATE OF CORRECTION

Patent No. 2,807,595 September 24, 1957

Northrop Brown

It is hereby certified that error appears in the printed specification of the above numbered patent requiring correction and that the said Letters Patent should read as corrected below.

Column 5, lines 14 and 15, for "formaldehyde mol ratio" read — formaldehyde-urea mol ratio —.

Signed and sealed this 12th day of November 1957.

(SEAL)
Attest:
KARL H. AXLINE
Attesting Officer

ROBERT C. WATSON
Commissioner of Patents